United States Patent [19]

Fitts

[11] Patent Number: 5,596,326

[45] Date of Patent: Jan. 21, 1997

[54] SECONDARY SURVEILLANCE RADAR INTERROGATION SYSTEM USING DUAL FREQUENCIES

[75] Inventor: Richard A. Fitts, Monroe, Conn.

[73] Assignee: Northrop Grumman Corporation, Los Angeles, Calif.

[21] Appl. No.: 503,442

[22] Filed: Jul. 17, 1995

[51] Int. Cl.$^6$ .............................. G01S 13/87; G01S 13/76
[52] U.S. Cl. .............................. 342/30; 342/32; 342/37; 342/40; 342/46
[58] Field of Search .............................. 342/30, 32, 37, 342/40, 46, 42, 44, 51

[56] References Cited

U.S. PATENT DOCUMENTS

| | | | |
|---|---|---|---|
| 3,714,650 | 1/1973 | Fuller et al. | 342/42 |
| 4,364,049 | 12/1982 | Moore et al. | 342/43 |
| 4,647,931 | 3/1987 | Mawhinney | 342/44 |
| 5,001,488 | 3/1991 | Joguet | 342/45 |
| 5,245,346 | 9/1993 | Nishimura et al. | 342/43 |
| 5,400,031 | 3/1995 | Fitts | 342/36 |

*Primary Examiner*—John B. Sotomayor
*Attorney, Agent, or Firm*—Walter G. Sutcliff

[57] ABSTRACT

A communication system is provided for identifying the position of aircraft in a surveillance area. The communication system includes a dual-frequency interrogator which produces two signals at different frequencies. These signals are transmitted over a narrow beam, scanning antenna, the antenna being located within the surveillance area. A transponder is provided on the aircraft with an auxiliary antenna assembly tuned to a frequency equivalent to the difference between the dual frequencies. The transponder produces a signal containing aircraft identification information. A processing unit is co-located on the aircraft with the transponder to receive the two signals transmitted by the interrogator and produce a signal equivalent to the difference between those signals. The difference signal produced by the processing unit is coupled with the transponder and is used to identify the position of aircraft on the ground. A stationary antenna and receiver are tuned to the frequency of the transponder response and receive the transponder response. The stationary receiver transmits information to a position-estimating computer regarding the time of arrival of the aircraft signal. The position-estimating computer also receives information from the interrogator regarding the time of interrogation and the position of the antenna at the interrogation time. The position-estimating computer processes this information to identify the position of the aircraft on the airport surface.

8 Claims, 2 Drawing Sheets

SECONDARY SURVEILLANCE RADAR INTERROGATION SYSTEM USING DUAL FREQUENCIES

BACKGROUND OF THE INVENTION

1. Field of the Invention

The present invention relates to a mobile communication system and, more particularly, to an interrogation/transponder system for identifying and locating the position of aircraft on or near an airport surface.

2. Description of the Prior Art

A mobile communication system for delivering communication between a transmitter, such as an interrogator, stationarily mounted in a certain fixed place, and a simple receiver, such as a transponder, mounted on a mobile object, has attracted considerable attention. Such communication systems have application in many fields. One such field of note is the identification and location of the position of aircraft.

Aircraft are typically equipped with SSR transponders. These SSR transponders respond to interrogation messages transmitted by means of a wide-area surveillance fixed station. The response message from the SSR transponder contains aircraft identification information and serves to identify the position and location of the aircraft as it travels from airport to airport. In order to provide uniformity, the SSR transponders must meet internationally-approved specifications.

These SSR transponders have been primarily used to identify the position of aircraft while they are in the air. In operation, an interrogator, which can be located at or near the airport surface, transmits an interrogation signal which is received and acted upon by the SSR transponder in the aircraft. The SSR transponder transmits a response signal which is picked up by a fixed receiver which can also be located near the airport surface. Using the time delay between sending the interrogation signal and receiving the response, the distance of the transponder from the airport can be measured. Using the scan angle information from the interrogator antenna, the azimuth of the aircraft can be determined.

Choices must be faced when selecting the transmit frequency of the interrogation signal. A trade-off must be made between the narrowness of the band signal and the ability of the signal to penetrate adverse weather conditions such as rain. Lower frequency signals are better adapted to penetrate adverse weather conditions. However, such lower frequencies require a much larger antenna to maintain the same beam width angle. Because of the necessity of accommodating adverse weather conditions, current SSR transponder systems sacrifice beam angle precision in order to transmit low frequency signals.

An emerging problem facing aircraft surveillance is the location of aircraft on the airport surface. The prior art SSR transponder systems used to locate aircraft in the air generally do not face the problem of receiving competing signals from separate aircraft. As a result, these systems use wide beam antenna patterns. However, when determining the aircraft position on the airport surface, the aircraft are in much closer proximity, thereby dramatically increasing the chances of receiving conflicting signals from separate aircraft. The wide beam antenna patterns used by the current SSR transponder systems are generally unable to distinguish closely situated aircraft on an airport surface.

Accordingly, there is a need for an improved aircraft surveillance system capable of distinguishing and locating aircraft on an airport surface. Because of the significant costs associated with such communication systems, it is strongly desired that such an improved system utilize as much as possible of the existing SSR transponder systems.

SUMMARY OF THE INVENTION

An improved communication system for identifying and locating the position of SSR-equipped aircraft in a surveillance area is provided in which the interrogator transmits two signals at dual frequencies. Preferably, these frequencies are in the KU band. The two frequencies are selected so that their difference is equal to 1030 MHz, the frequency at which existing SSR transponders operate.

When an aircraft is within range of the interrogator, the SSR transponder on the aircraft processes the interrogation signal and transmits a response message which contains the aircraft identification information. This response signal is received by stationary antenna and a receiver tuned to the SSR response frequency. The receiver measures the response time of arrival and demodulates the signal to recover the aircraft identification information. This information is passed to a position-estimating computer which calculates the position of the SSR transponder.

DETAILED DESCRIPTION OF THE PREFERRED EMBODIMENTS

Figure 1:
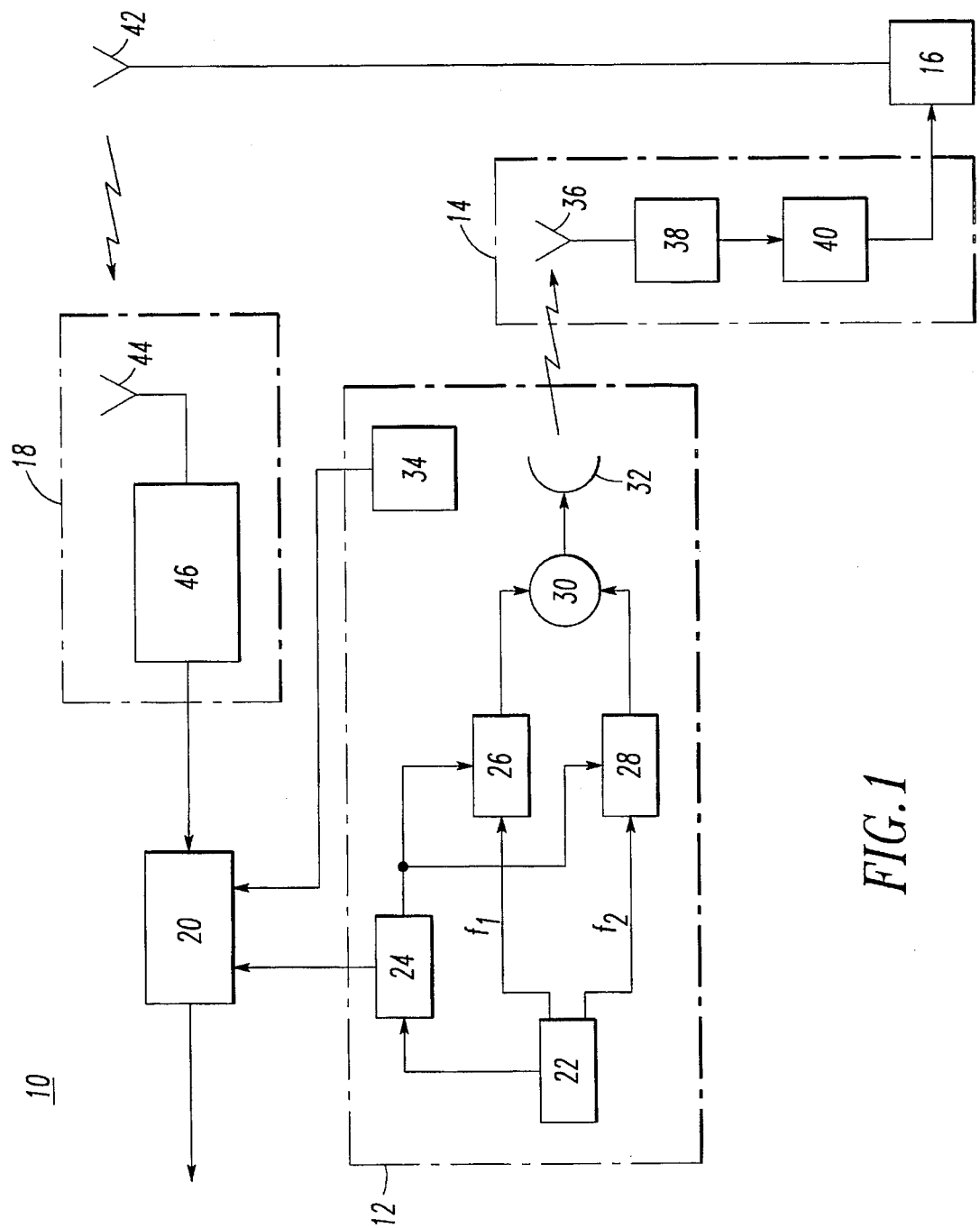
FIG. 1 is a block diagram showing a presently preferred embodiment of the interrogation system of the present invention.

FIG. 1 shows the presently preferred embodiment of communication system 10 having as its principal parts interrogator 12, a passive, non-linear device 14 acting as an RF mixer which is co-located with an aircraft SSR transponder 16, a stationary receiving means 18 tuned to the SSR response frequency, and a position-estimating computer 20.

Interrogator 12 includes a generator 22 which produces a valid SSR interrogation signal and an offset carrier. The SSR interrogation signal and the offset carrier use two separate frequencies $f_1$ and $f_2$. The two transmit frequencies $f_1$ and $f_2$ are selected such that the difference of the two frequencies $(f_1-f_2)$ is equal to the nominal SSR interrogation frequency of 1.030 GHz (1030 MHz). Modulator 24 operationally connected to generator 22 acts on signals $f_1$ and $f_2$ by means of up converters 26 and 28, respectively. The converted signals from up converters 26 and 28 are collected by combiner 30 and transmitted by means of scanning antenna 32. Antenna position recorder 34 tracks the position of scanning antenna 32 and feeds such position information to position-estimating computer 20. In a like manner, modulator 24 provides position-estimating computer 20 with information regarding signal generation.

Aircraft within the beam width of scanning antenna 32 receive the interrogation signals by means of non-linear device 14. The signals are received by wide-band antenna 36 which covers both interrogation frequencies $f_1$ and $f_2$. Antenna 36 feeds the received signals into a mixer 38 which can be implemented using a passive, nonlinear device such as a diode. Mixer 38 generates sum $(f_1+f_2)$ and difference $(f_1-f_2)$ products. These difference products are coupled by means of coupler 40 and fed to the input of SSR transponder 16. Because the difference product generated by the nonlinear device 14 is 1030 MHz and because the difference product was properly modulated by the interrogator 12, the SSR transponder 16 transmits a response to the interrogation. The SSR transponder response message, which contains aircraft identification information, is transmitted by means of SSR antenna 42 operating at 1090 MHz.

The response message transmitted by SSR transponder antenna 42 is received by stationary receiving means 18. Stationary receiving means 18 includes stationary antenna 44 which receives the response message and a receiver 46 tuned to the SSR response frequency. Receiver 46 measures the response time of arrival and demodulates the signal to recover the aircraft identification information. Receive 46 passes this information to position-estimating computer 20.

Position-estimating computer 20 calculates the position of SSR transponder 16. The range of SSR transponder 16 is determined by measuring the time delay from transponder interrogation to reception of the response message. Azimuth position of SSR transponder 16 is determined by measuring the antenna scan position at the time of interrogation.

Communication system 10 provides the ability to locate surface aircraft with minimal cost involvement. Because interrogator 12 is operating in the KU frequency band, an antenna having a relatively small size is required to obtain high precision azimuth position information. For example, if the frequencies of signals $f_1$ and $f_2$ are selected as 16 GHz and 17.030 GHz, respectively, a 16-foot scanning antenna 32 would provide a very narrow beam width such as 0.25 degrees. In order to provide a similar very narrow beam width for a 1030 MHz signal, scanning antenna 32 must be 16 times larger than the 16-foot antenna used in the present system. Because airports currently use a 16 foot KU band scanning antenna, the present invention does not require any new antenna investment for the airports.

Figure 2:
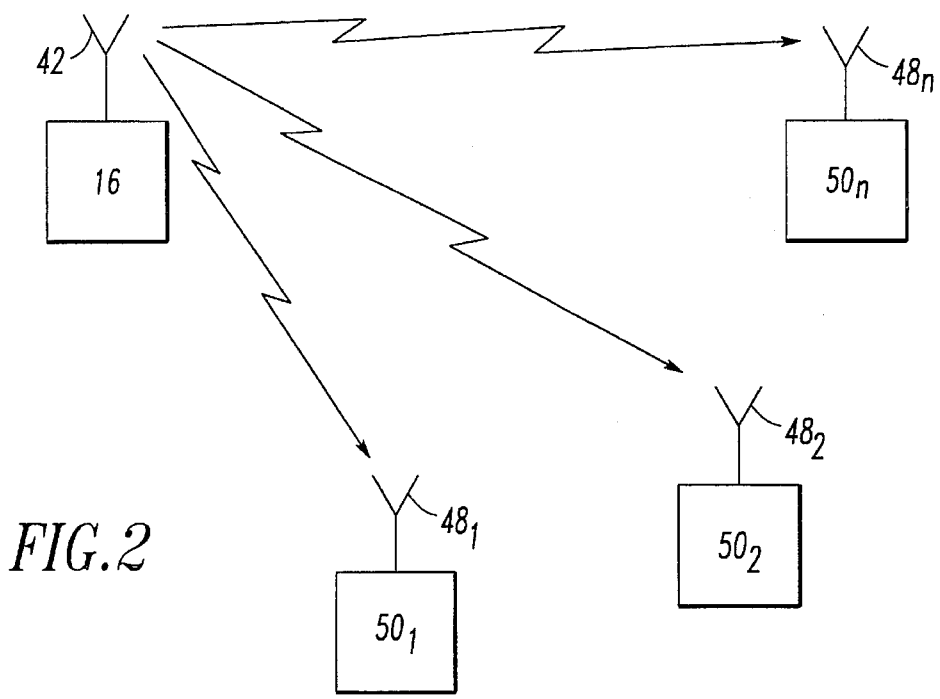
FIG. 2 is a block diagram demonstrating an alternative process for estimating aircraft position.

A competing airplane location system is presented in FIG. 2. This system, which is known as multilateration, illustrates SSR transponder 16 and antenna 42 transmitting an identification signal to a plurality of receiver antennas 48 in connection with receivers 50. A position-estimating computer triangulates identification information received from each of the plurality of receivers 50 to determine the position of the aircraft on which transponder 16 is mounted.

Communication system 10 shown in FIG. 1 requires little additional investment. A new stationary receiving means 18 tuned specifically to 1090 MHz, the frequency at which SSR transponder antenna 42 transmits must be provided. In addition, a new position-estimating computer 20 is needed which interacts with the position information provided by modulator 24, antenna position recorder 34, and receiver 46. Finally, nonlinear device 14 must be added to each aircraft to communicate with SSR transponder 16.

Figure 3:
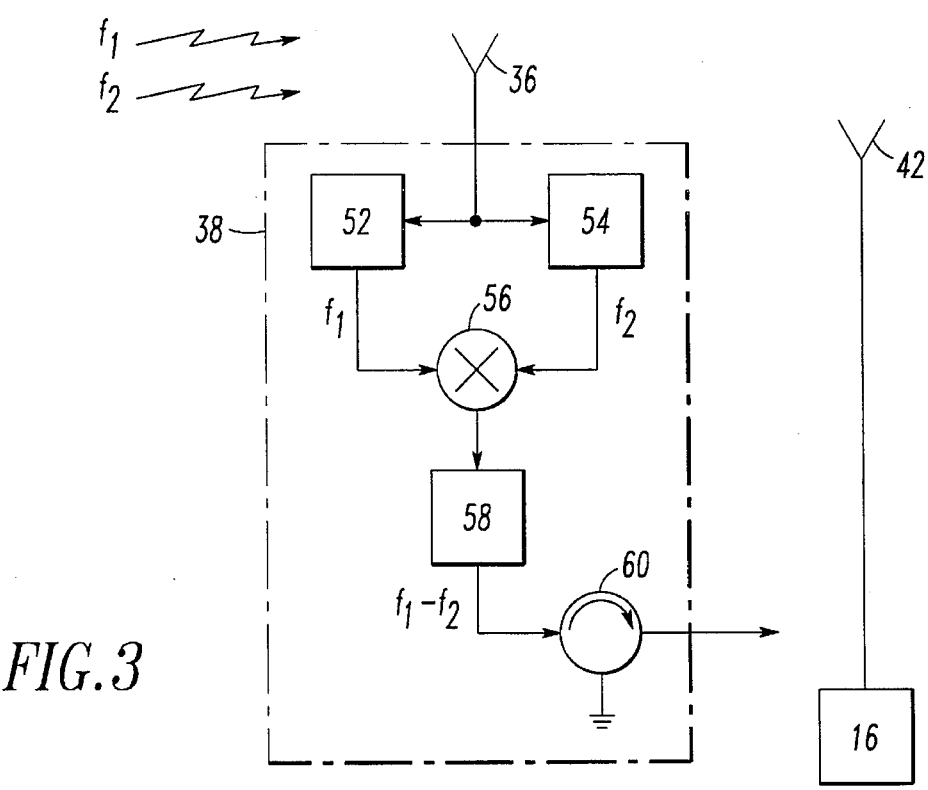
FIG. 3 is a block diagram showing a presently preferred embodiment of the nonlinear device used in the communication system of FIG. 1.

FIG. 3 shows a presently preferred design of nonlinear device 14. As shown in FIG. 3, broad-band antenna 36 receives signals $f_1$ and $f_2$ transmitted by scanning antenna 32. These signals are processed by mixer 38 which includes a low-band pass filter 52 tuned to the frequency of signal $f_1$ and a high-band pass filter 54 tuned to the frequency of signal $f_2$. Band pass filters 52 and 54 produce signals corresponding to $f_1$ and $f_2$, respectively. These signals are processed by mixer 56 which produces summation and difference products $(f_1+f_2)$ and $(f_1-f_2)$, respectively. Band pass filter 58 blocks the summation product permitting only the difference product $(f_1-f_2)$ to be further transmitted. This difference product passes through isolator 60. Isolator 60 protects mixer 56 by preventing any energy associated with the SSR transponder 16 reply from coupling with and destroying mixer 56.

By using the higher KU frequency band, the present communication system 10 is able to generate very narrow beam angle signals. The narrowness of the beam angle of these signals permits communication system 10 to isolate and identify specific aircraft on an airport surface. The present invention minimizes modifications that need to be made to existing aircraft equipment by requiring only a modification to the SSR antenna. The present invention utilizes existing scanning antennas such as the ASDE-3 system, thereby eliminating the need for additional costly antennas. The additional aircraft components can be totally passive, thereby providing exceptional reliability and low cost. Finally, the present invention utilizes internationally approved SSR transponders thereby being suitable for all aircraft application.

In the foregoing specification, certain preferred practices and embodiments of this invention have been set out. However, it will be understood that the invention may be otherwise embodied within the scope of the following claims:

I claim:

1. A communication system for identifying the position of aircraft in a surveillance area comprising:

a. a dual-frequency interrogator having a narrow beam, scanning antenna, said antenna being located within said surveillance area, said interrogator producing and transmitting two signals at different frequencies;

b. a processor located on said aircraft to receive said two signals and produce a signal having a frequency equivalent to the difference between said dual frequencies;

c. a transponder provided on said aircraft, said transponder tuned to a frequency equivalent to the difference between said dual frequencies, said transponder receiving said processor signal and producing a signal containing aircraft identification information;

d. stationary antenna and receiver for receiving said transponder response; and e. an estimator for estimating the position of said aircraft.

2. The communication system of claim 1 wherein the frequencies of each of said signals transmitted by said interrogator is in the KU frequency band.

3. The communication system of claim 1 wherein said estimator receives information from said interrogator regarding the time of interrogation and the position of said narrow beam, scanning antenna and receives information from said stationary receiver regarding the time of arrival of said transponder response.

4. The communication system of claim 3 wherein said processor is coupled with said transponder.

5. The communication system of claim 4 wherein said processor includes a pair of band pass filters to isolate each of said dual-frequency signals, a mixer for combining said isolated dual-frequency signals to produce a summation product signal and a difference product signal, band pass signal means for isolating said difference signal and isolation means for preventing any power associated with said transponder replies from damaging said processor.

6. The communication system of claim 4 wherein said processor is a non-linear device.

7. A method for identifying the position of aircraft in a surveillance area wherein a dual-frequency interrogator having a narrow beam, scanning antenna is located within said surveillance area and a transponder tuned to a frequency equivalent to the difference between said dual frequencies is provided on said aircraft comprising the steps of;

a. producing and transmitting two interrogation signals at different frequencies at said interrogator;

b. receiving said two interrogation signals on said aircraft;

c. processing said two signals and producing a difference signal equivalent to the difference between said two signals;

d. receiving said difference signal at said transponder and producing and transmitting a transponder signal, said transponder signal containing aircraft identification information;

e. receiving said transponder response at a stationary antenna; and f. estimating the position of said aircraft.

8. The method of claim 7 wherein the frequencies of each of said signals transmitted by said interrogator is in the KU frequency band.

\* \* \* \* \*